2,859,238
Patented Nov. 4, 1958

2,859,238
TRIALKYL PHOSPHITES

Theodor Reetz, Webster Groves, Mo., assignor to Monsanto Chemical Company, St. Louis, Mo., a corporation of Delaware No Drawing. Application May 28, 1956
Serial No. 587,478

11 Claims. (Cl. 260—461)

This invention relates to a new and novel process for manufacturing trialkyl phosphites, but particularly trimethyl phosphite.

In the manufacture of trialkyl phosphites it has been customary to add phosphorus trihalide to an aliphatic alcohol in the presence of an organic tertiary amine base in an amount at least sufficient to absorb the by-product hydrogen halide. While the yield and purity of the trialkyl phosphite are good, the procedure is expensive and entails time-consuming recovery and purification operations, particularly with respect to conditioning the organic amine base for reuse.

In accordance with this invention there is provided a commercially feasible method of preparing substantially pure trialkyl phosphites in high yields, the novel process comprising admixing and reacting under anhydrous conditions a phosphorus trihalide and an aliphatic alcohol in the presence of ammonium carbamate. It is preferred that the reaction be conducted in the presence of an inert organic liquid, as for example diethyl ether, petroleum ether, methyl chloride, dichloromethane, ethyl chloride, methyl ethyl ether, butane, pentane, hexane, heptane, and others of like nature. An excess of the alcohol reactant may also be employed as the liquid medium.

The over-all equation of the reaction of this invention may be represented as follows

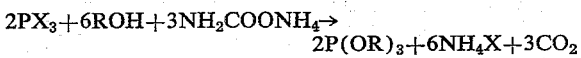

$$2PX_3 + 6ROH + 3NH_2COONH_4 \rightarrow 2P(OR)_3 + 6NH_4X + 3CO_2$$

where X is a halogen atom (such as chlorine or bromine) and where R is an aliphatic radical (such as methyl, ethyl, propyl, isopropyl, n-butyl, n-amyl, isoamyl, sec.-amyl, hexyl, heptyl, 2-ethylhexyl, decyl, dodecyl, and the like, as well as isomers thereof and mixtures thereof). In its preferred embodiment there is admixed the phosphorus trihalide and the aliphatic alcohol in stoichiometric amounts and sufficient ammonium carbamate to maintain a pH of not less than 7 throughout the course of the reaction. In general the total amount of ammonium carbamate when employed in the preferred embodiment of this invention will be in excess of the stoichiometric amount with respect to the phosphorus trihalide reactant, which amount of ammonium carbamate will ordinarily be in the range of 125% to 200% of the stoichiometric amount. When such an excess is employed the stoichiometric amount or any fraction thereof may be initially charged and as the reaction proceeds sufficient ammonium carbamate is added to maintain the reaction system at a pH of not less than 7. It is to be understood that this invention is not limited to the foregoing embodiments but embraces any means which effect its (i. e. ammonium carbamate) presence in amounts which provide a pH of not less than 7. For example, less than the stoichiometric amount with respect to the phosphorus trihalide reactant may be charged initially, and as the reaction proceeds and carbon dioxide evolves anhydrous ammonia may be added so as to react with the evolving carbon dioxide to provide the necessary amount of ammonium carbamate to maintain the reaction system at a pH of 7 or above. Care must be taken, however, that the amount of gaseous ammonia added does not substantially exceed that which theoretically combines with the evolving carbon dioxide to provide ammonium carbamate.

Specifically the instant process comprises forming a trialkyl phosphite by the addition of a phosphorus trihalide to the stoichiometric amount or an excess of an aliphatic alcohol which may or may not be diluted with an inert organic solvent in the presence of ammonium carbamate while maintaining the system at a pH of 7 or above throughout the course of the reaction. While the phosphorus halide may be added per se it is preferred that it be added in solution form. It is preferred that a temperature in the range of —40° C. to 30° C. be employed. However, any temperature which provides a fluid medium and which is not above the decomposition temperature of the component parts of the reaction may be employed.

As illustrative of the process of this invention but not limitative thereof is the following:

Example I

To a suitable reaction vessel equipped with a stirrer, thermometer and a condenser is charged 58 parts by weight of methyl alcohol, 140 parts by weight of ammonium carbamate and 468 parts by weight of dichloromethane. Thereto is added over a period of about 4.5 hours and with agitation a mixture of 68.7 parts by weight of phosphorus trichloride and 134 parts by weight of dichloromethane, while maintaining the temperature during the addition at about —5° C. Upon completion of the phosphorus trichloride addition the mass is agitated at room temperature and subsequently admixed with 300 parts by weight of water and the mix agitated at room temperature for about 15 minutes. The organic layer is separated (analysis indicated the organic layer contained 96.5% of theory of tri-valent phosphorus), dried over anhydrous sodium sulfate, and subjected to distillation at atmospheric pressure to remove dichloromethane. Upon distilling the residue a yield of 86.45% of theory of pure trimethyl phosphite is obtained.

Example II

To a suitable reaction vessel equipped with a stirrer, thermometer and a condenser is charged 82.8 parts by weight of ethyl alcohol, 85.8 parts by weight of ammonium carbamate, and 334 parts by weight of dichloromethane. Thereto is added over a period of about 1.1 hours and with agitation a mixture of 68.8 parts by weight of phosphorus trichloride and 134 parts by weight of dichloromethane, while maintaining the temperature during the addition at —5° C. to 0° C. Upon completion of the phosphorus trichloride addition the mass is agitated at room temperature for about 12 hours. The mass is washed with 270 parts by weight of water to remove the water-soluble substances, such as ammonium chloride. The organic layer is separated (analysis indicated the organic layer contained 99.2% of theory of tri-valent phosphorus) and subjected to distillation at atmospheric pressure to remove the dichloromethane. Upon subjecting the residue to vacuum distillation a yield in excess of 93% of theory of pure triethyl phosphite is obtained.

Example III

To a suitable reaction vessel equipped with a stirrer, thermometer and a condenser is charged 108 parts by weight of isopropyl alcohol, 78 parts by weight of ammonium carbamate, and 334 parts by weight of dichloromethane. Thereto is added over a period of about 4 hours and with agitation a mixture of 68.8 parts by weight of phosphorus trichloride and 67 parts by weight of dichloromethane, while maintaining the temperature during the addition at −2° C. to 4° C. Upon completion of the phosphorus trichloride addition the mass is agitated at room temperature for about 3 hours. The mass is washed with 250 parts by weight of water to remove the ammonium chloride and excess ammonium carbamate. The organic layer is separated, dried over anhydrous sodium sulfate, and subjected to distillation at atmospheric pressure to remove the dichloromethane. Upon distilling the residue at reduced pressure a yield of 92.5% of pure triisopropyl phosphite is obtained.

Similarly high yields of the corresponding trialkyl phosphite are obtained employing in place of the alcohols of Examples I, II and III such alcohols as n-hexanol, n-heptanol, 2-ethylhexanol, decanol, dodecanol, and the like.

In the preparation of trialkyl phosphites from high molecular weight alcohols, such as the $C_{6-12}$ aliphatic alcohols, some advantage has been found in employing in the reaction system as hereinbefore defined a small amount of a trialkyl amine. As illustrative of such is the following:

Example IV

To a suitable reaction vessel equipped with a stirrer, thermometer and a condenser is charged 217 parts by weight of n-heptyl alcohol, 85.8 parts by weight of ammonium carbamate, 15 parts by weight of triethyl amine, and 400 parts by weight of dichloromethane. Thereto is added over a period of about 3 hours and with agitation a mixture of 68.8 parts by weight of phosphorus trichloride and 134 parts by weight of dichloromethane, while maintaining the temperature during the addition at 0° C. Upon completion of the phosphorus trichloride addition the mass is agitated at room temperature for about 3 hours. The mass is washed with 310 parts by weight of water to remove the water-soluble products. The organic layer is separated, dried over anhydrous sodium sulfate, and distilled to remove the dichloromethane. The residue (162.3 parts by weight) is admixed with 30 parts by weight of n-heptyl alcohol and refluxed for 3 hours. The mass is then distilled at reduced pressure. The distillate collected at 112–114° C. and 0.08 mm. is pure tri-n-heptyl phosphite (yield 52% of theory based on phosphorus trichloride charged).

As the foregoing disclosure attests, the process of this invention is applicable to the preparation of trialkyl phosphites from a wide variety of straight and branched chain aliphatic alcohols. The process of this invention is particularly applicable to the preparation of trialkyl phosphites from low molecular weight alcohols, such as methyl alcohol, ethyl alcohol, and isopropyl alcohol, but specifically the trialkyl phosphite, i. e. trimethyl phosphite, from methyl alcohol.

While any pH of not less than 7 may be employed in the process of this invention, it is preferred that a pH in the range of 7 to 10 be employed. By pH of the system is meant the pH of an aqueous solution of a representative sample of the reacting mass.

In the process of this invention upon completion of the reaction the ammonium chloride may be filtered off, however, the nature of the resultant reaction mass is such that it may be washed with water in order to remove the ammonium chloride and excess of ammonium carbamate without fear of substantial hydrolysis of the trialkyl phosphite. Such a step affords a substantial reduction in operating costs.

While this invention has been described with respect to certain embodiments it is not so limited and it is to be understood that variations and modifications thereof obvious to those skilled in the art may be made without departing from the spirit or scope of this invention.

What is claimed is:
1. The process of making trialkyl phosphites which comprises reacting a phosphorus halide and an aliphatic alcohol in substantially stoichiometric amounts in the presence of ammonium carbamate, the pH of the reaction system being not less than 7.
2. The process of claim 1 wherein the reaction temperature is in the range of −40° C. to 30° C.
3. The process of claim 2 conducted in the presence of an inert organic liquid medium.
4. The process of claim 2, conducted in the presence of a substantial excess of the stoichiometric amount of the alcohol reactant, the excess serving as a solvent for the reaction mixture.
5. The process of claim 3 wherein the phosphorus trihalide reactant is phosphorus trichloride.
6. The process of claim 5 wherein the alcohol reactant is a low molecular weight alcohol containing 1 to 3 carbon atoms.
7. The process of claim 6 wherein the alcohol reactant is methyl alcohol.
8. The process of claim 6 wherein the alcohol reactant is ethyl alcohol.
9. The process of claim 6 wherein the alcohol reactant is isopropyl alcohol.
10. The process of making trialkyl phosphites which comprises reacting in an inert organic medium phosphorus trichloride and a low molecular weight alcohol containing 1 to 3 carbon atoms in substantially stoichiometric amounts in the presence of ammonium carbamate at a temperature in the range of −40° C. to 30° C., washing the resultant reaction mass with water, separating the organic layer and recovering the trialkyl phosphite, the quantity of said ammonium carbamate being sufficient to maintain the reaction system at a pH in the range of 7 to 10.
11. The process of claim 10 wherein the alcohol reactant is methyl alcohol.

References Cited in the file of this patent

UNITED STATES PATENTS 2,678,940     Boyer et al. _____ May 18, 1954

OTHER REFERENCES

Macleod: "Chemisches Zentralblatt," 1905, I. 469.
Beilstein: "Organische Chemie," 3, II, 20 (1910).
Kosolapoff: "Organophosphorus Compounds," p. 184, John Wiley & Sons, New York, N. Y. (1951).
Nolf: Zeitschrift für Physiologische Chemie (Hoppe-Seyler), 23, 505.
Drechsel: Journal für Praktische Chemie (2), 12, 417; id. ibid. 16, 187.